United States Patent
Bergeron

(10) Patent No.: US 10,897,451 B2
(45) Date of Patent: Jan. 19, 2021

(54) SYSTEM AND METHOD FOR TRANSMITTING OVER MULTIPLE SIMULTANEOUS COMMUNICATION NETWORKS BY USING POINT-TO-POINT PROTOCOL OVER ETHERNET

(71) Applicant: RADIO IP SOFTWARE INC., Longueuil (CA)

(72) Inventor: Yvon Bergeron, Varennes (CA)

(73) Assignee: RADIO IP SOFTWARE INC.

( * ) Notice: Subject to any disclaimer, the term of this patent is extended or adjusted under 35 U.S.C. 154(b) by 228 days.

(21) Appl. No.: 15/553,396

(22) PCT Filed: Feb. 26, 2016

(86) PCT No.: PCT/CA2016/050202
§ 371 (c)(1),
(2) Date: Aug. 24, 2017

(87) PCT Pub. No.: WO2016/134481
PCT Pub. Date: Sep. 1, 2016

(65) Prior Publication Data
US 2018/0131670 A1 May 10, 2018

Related U.S. Application Data

(60) Provisional application No. 62/121,926, filed on Feb. 27, 2015.

(51) Int. Cl.
*G06F 13/00* (2006.01)
*H04L 29/12* (2006.01)
(Continued)

(52) U.S. Cl.
CPC ...... *H04L 61/2015* (2013.01); *H04L 12/2859* (2013.01); *H04L 45/24* (2013.01);
(Continued)

(58) Field of Classification Search
CPC . H04L 45/24; H04L 61/2015; H04L 12/2859; H04L 67/141; H04L 61/2514; H04W 76/10; H04W 40/02; H04W 92/02
(Continued)

(56) References Cited

U.S. PATENT DOCUMENTS 6,694,437 B1    2/2004  Pao et al.
7,188,179 B1 *  3/2007  Hanson ............... H04L 12/5692
                                                    709/227

(Continued)

FOREIGN PATENT DOCUMENTS

WO      0171977 A2      9/2001
WO      2010132710 A1   11/2010

OTHER PUBLICATIONS

International Search Report in corresponding application PCT/CA2016/050202.

*Primary Examiner* — Kenneth R Coulter
(74) *Attorney, Agent, or Firm* — Lavery, De Billy, LLP; Hugh Mansfield

(57) ABSTRACT

A system and method for controlling simultaneous communications over a plurality of communication networks that employs Point-to-Point Protocol over Ethernet (PPPoE) connections between a plurality of Ethernet connected clients and a plurality of wireless radio modems for wireless network access control. The method comprises transmitting data between the one or more clients and one or more wireless modems for communication over the one or more wireless networks based on the assigned IP address of the one or more clients based upon during a PPPoE or DHCP session. The system comprises one or more multi-radio modems for transmitting data over one or more wireless networks, an Ethernet LAN for connecting the one or more PPPoE and DHCP enabled clients to the one or more multi-radio modems, one or more Access Concentrators for (Continued)

controlling access to the one or more radio modems and for assigning an Internet Protocol address to the one or more PPPoE enabled clients, and a DHCP server for controlling access to the one or more radio modems and for assigning an Internet Protocol address to the one or more DHCP enabled clients. A controller coordinates communications between the PPPoE client and the one or more radio modems based on the assigned Internet Protocol address of the PPPoE client or DHCP client.

13 Claims, 6 Drawing Sheets

(51) Int. Cl.
*H04W 76/10* (2018.01)
*H04L 12/707* (2013.01)
*H04L 12/28* (2006.01)
*H04L 29/08* (2006.01)
*H04W 92/02* (2009.01)
*H04W 40/02* (2009.01)

(52) U.S. Cl.
CPC ........... *H04L 67/141* (2013.01); *H04W 76/10* (2018.02); *H04L 61/2514* (2013.01); *H04W 40/02* (2013.01); *H04W 92/02* (2013.01)

(58) Field of Classification Search
USPC .......................... 709/203, 245, 227, 238, 239
See application file for complete search history.

(56) References Cited

U.S. PATENT DOCUMENTS

| | | | |
|---|---|---|---|
| 7,551,641 B2 | 6/2009 | Pirzada et al. | |
| 7,620,065 B2 | 11/2009 | Falardeau | |
| 7,843,884 B2 | 11/2010 | Heller | |
| 8,281,015 B2* | 10/2012 | Jia .................. | H04L 12/2856 709/220 |
| 8,347,075 B1* | 1/2013 | Zhang ................ | H04L 63/1441 380/256 |
| 2003/0167338 A1* | 9/2003 | Hare .................. | H04L 12/4633 709/236 |
| 2003/0177385 A1* | 9/2003 | Price ..................... | H04L 63/08 713/171 |
| 2005/0157703 A1 | 7/2005 | Roh | |
| 2005/0195751 A1* | 9/2005 | Jones .................. | H04L 12/2859 370/254 |
| 2005/0243857 A1 | 11/2005 | Hofstaedter et al. | |
| 2005/0249210 A1* | 11/2005 | Heller .................. | H04W 76/22 370/389 |
| 2006/0023676 A1 | 2/2006 | Whitmore et al. | |
| 2007/0086383 A1 | 4/2007 | Watanabe et al. | |
| 2008/0101291 A1 | 5/2008 | Jiang et al. | |
| 2008/0159302 A1* | 7/2008 | Tu ....................... | H04L 12/2856 370/401 |
| 2008/0162702 A1* | 7/2008 | Jia ...................... | H04L 12/2856 709/227 |
| 2009/0313690 A1 | 12/2009 | Bichot et al. | |
| 2010/0177754 A1 | 7/2010 | Edmond et al. | |

* cited by examiner

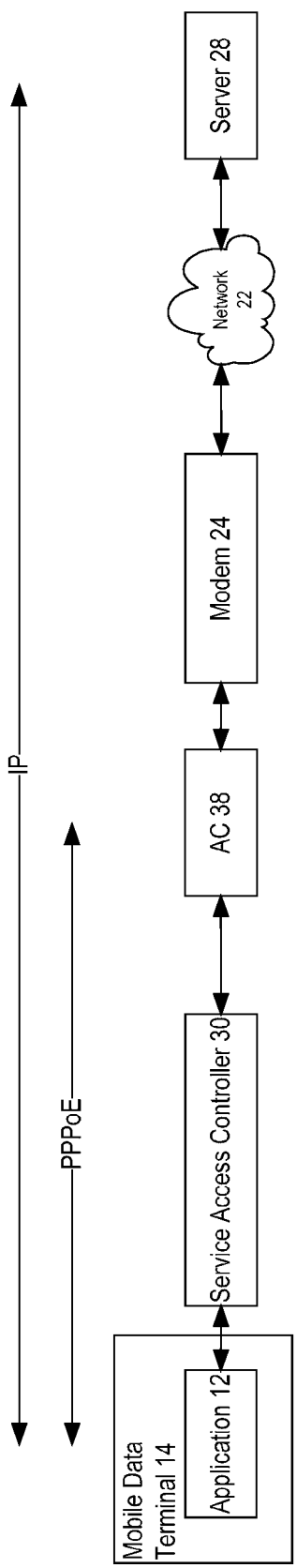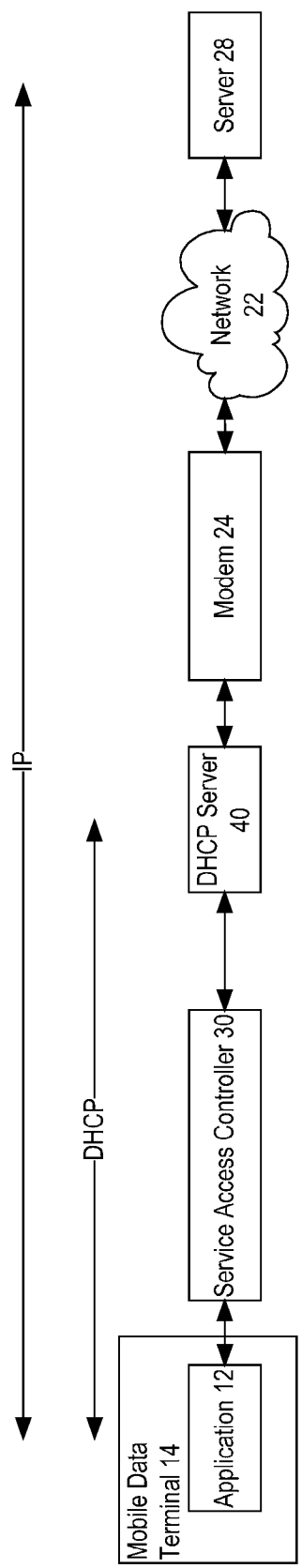
FIGURE 3A
FIGURE 3B

SYSTEM AND METHOD FOR TRANSMITTING OVER MULTIPLE SIMULTANEOUS COMMUNICATION NETWORKS BY USING POINT-TO-POINT PROTOCOL OVER ETHERNET

CROSS-REFERENCE TO RELATED APPLICATIONS

This application is a National Entry Application of PCT application no PCT/CA2016/050202 filed on Feb. 26, 2016 and published in English under PCT Article 21(2), which claims benefit of U.S. provisional application Ser. No. 62/121,926 filed on Feb. 27, 2015. All documents above are incorporated herein in their entirety by reference.

FIELD OF THE INVENTION

The present invention relates to a system and method of controlling communications of multi-radio modems to provide simultaneous communications over a plurality of wireless communication networks. In particular, there is provided a system and method for controlling simultaneous communications over a plurality of communication networks that employs Point-to-Point Protocol over Ethernet (PPPoE) connections between a plurality of Ethernet connected clients and a plurality of wireless radio modems for wireless network access control.

BACKGROUND OF THE INVENTION

The prior art reveals a number of systems and methods of communicating over a plurality of communication networks using wireless modems based upon various network selection factors such as network availability, quality of service (QoS) requirements, performance, security requirements, or the like. Many of these systems and methods entail switching communication data between different radio modems based upon roaming rules which consider the characteristics of the network for determining which networks to utilize for communications. However, while such rules may be based on, for instance, the communication protocols employed by a network, the destination address and port of communication data, or the application name or type, such control of data flow over a particular communication network is determined by a multi-radio modem, and not by the client. Consequentially, data communications between the client may potentially roam to networks which are not suited to ensure certain performance, security and cost effective data exchanges.

Moreover, client devices connected to a LAN, such as Ethernet, in the context of a mobile public safety applications, such as police, law enforcement, emergency responders or the like, require a manner by which multiple mobile data terminals are able to communicate over select communication networks in light of the data to be transmitted and the attributes of the networks, such as security, reliability, or cost. Current prior art systems and methods of communicating over a plurality of communication networks do not provide the ability for a LAN connected client to select the network over which to communicate in a secured and controlled manner.

What is therefore needed, and one object of the present invention, is a system and method for controlling the data flow between a client and a plurality of mobile multi-radio modems for communicating over multiple wireless communication networks by using Point-to-Point Protocol over Ethernet (PPPoE) sessions.

SUMMARY OF THE INVENTION

In order to address the above and other drawbacks, there is provided a method of transmitting data from a PPPoE enabled client to a remote server having a server address via at least one of a plurality of different wireless networks. The method comprises connecting the PPPoE enabled client and an access concentrator to an Ethernet LAN, the access concentrator controlling access to a radio modem for communicating via a selected wireless network, wherein the access concentrator is one of a plurality of access concentrators each controlling access to a respective one of a plurality of radio modems, each of the radio modems for communicating via one of the plurality of different wireless networks, establishing a PPPoE session using the Ethernet LAN between the PPPoE enabled client and the access concentrator, the access concentrator assigning a client address to the PPPoE enabled client, opening a connection between the PPPoE enabled client and the remote server using the server address, the assigned client IP address and the PPPoE session over the selected wireless network, and transmitting data from the PPPoE enabled client to the remote server using the connection.

There is also provided a multi-radio modem for interconnecting at least one PPPoE enabled client on an Ethernet LAN with a remote server via at least one of a plurality of different wireless networks. The multi-radio modem comprises an interface configured for attachment to the Ethernet LAN, a plurality of radio modems, each of the radio modems for communicating via a respective one of the plurality of different wireless networks, and a plurality of access concentrators, one of the concentrators associated with each of the radio modems for assigning an address to a connected one of the at least one PPPoE enabled client.

Additionally, there is provided a mobile wireless communication system comprising a plurality of wireless networks, an Ethernet LAN, a PPPoE enabled client connected to the Ethernet LAN, and a multi-radio modem connected to the Ethernet LAN and comprising a plurality of radio modems, wherein each of the radio modems provides access to a respective one of the plurality of wireless networks, and a plurality of access concentrators, one of the concentrators associated with each of the radio modems, a PPPoE session between the PPPoE enabled client and a connected one of the access concentrator, wherein the connected access concentrator provides a client address to the PPPoE enabled client, a remote server having a remote address, and a data connection between the PPPoE enabled client and the remote server using the PPPoE connection, the client address, the server address and over a respective wireless network of the connected access concentrator.

BRIEF DESCRIPTION OF THE DRAWINGS

FIG. 3A is a conceptual model of the mobile wireless communication system of FIG. 1 employing PPPoE communication sessions;

FIG. 3B is a conceptual model of the mobile wireless communication system of FIG. 1 employing DHCP communication sessions;

DETAILED DESCRIPTION OF THE ILLUSTRATIVE EMBODIMENTS

Figure 1:
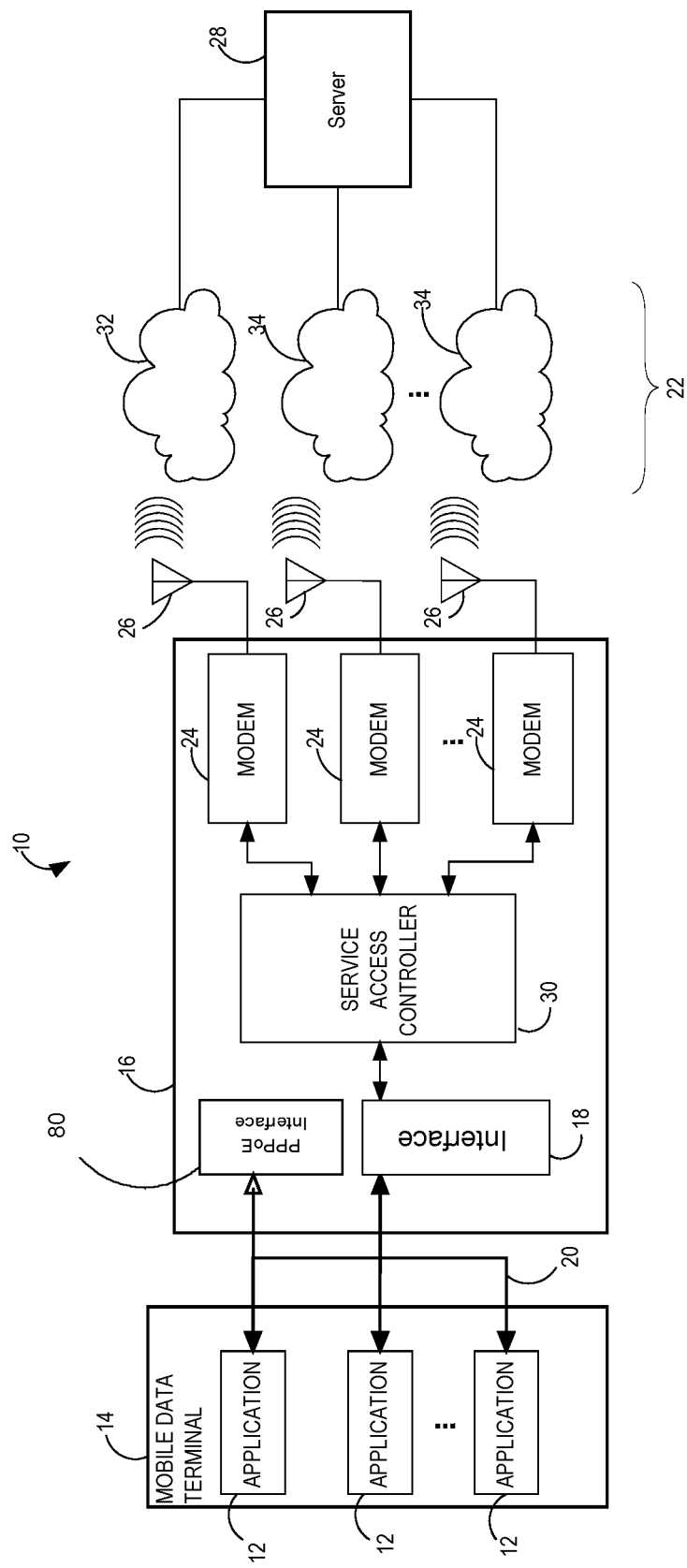
FIG. 1 is a schematic diagram of a mobile wireless communication system in accordance with an illustrative embodiment of the present invention.

Referring now to FIG. 1, there is disclosed a mobile wireless communication system, generally referred to using the reference numeral 10. The wireless communication system 10 is comprised of mobile client applications as in 12, for example in the form of software applications executed on a portable terminal as in 14 such as a general purpose computer, a mobile data terminal or a Personal Device Assistant (PDA), which communicates with a multi-radio wireless modem 16 via an interface 18, such as an Ethernet network interface controller or the like. The interface 18 may also illustratively comprise a hub or a router for connecting one or more portable terminals as in 14 over a LAN, for instance an Ethernet LAN 20, using the IEEE 802.3 standards, with the multi-radio wireless modem 16 for transmission of data packets between the portable terminal as in 14 and the multi-radio wireless modem 16. The multi-radio wireless modem 16 is illustratively located in proximity to the portable terminal as in 14 within which the mobile client application as in 12 resides. Of note, while a wired Ethernet LAN 20 is illustratively provided, a wireless Ethernet LAN may also be provided to connect the portable terminal as in 14 with the multi-radio wireless modem 16.

Still referring to FIG. 1, the mobile client application as in 12 may illustratively form part of one or more data software suites (not shown) running on the portable terminal as in 14, or may be a stand-alone background software application installed on the portable terminal as in 14 running transparently to a user of the terminal as in 14 and to the data software suite for accessing a particular wireless network 22 as will be described herein below. As part of the mobile client application as in 12, there is illustratively provided a Network Driver Proxy (not shown), or a virtual dial-up adapter, integrated therein to provide an interface for the mobile client application as in 12 to connect over the Ethernet LAN 20 and other networks. By providing such an adapter, the mobile client application as in 12 is able to be identified by a unique IP address as will be described herein below.

Still referring to FIG. 1, the multi-radio wireless modem 16 receives commands and data from the one or more mobile client applications as in 12 via the interface 18 and encodes the data for transmission over the one or more wireless communication networks as in 22 via the one or more radio modems as in 24 and antennas as in 26. Similarly, transmissions received at the antennas as in 26 from other participants of the wireless communication system 10, such as an application server 28 which may illustratively be queried by a data software suite installed on the portable terminal as in 14 for retrieving data, are decoded by the radio modem as in 24 for subsequent transferral to the portable terminal as in 14 via the interface 18. Of note, while the mobile wireless communication system 10 is described with reference to a multi-radio wireless modem 16, a mobile application client as in 12 may communicate with other multi-radio wireless modems 16 connected to the Ethernet LAN 20 for data transmission over other types of wireless communication networks as in 22 as supported by other radio modems as in 24 housed therein. Additionally, a multi-radio wireless modem 16 may comprise one or more radio modems 24 which is easily scalable by adding or removing radio modems 24 to support different radio communication types.

Still referring to FIG. 1, the multi-radio wireless modem 16 advantageously enables communication with an application server 28 over the one or more various wireless communication networks 22, wherein each network 22 comprises different transmission characteristics and advantages for communication there over. Such characteristics and advantages illustratively comprise bandwidth, range, speed, quality, cost, power consumption, security, and the like. For instance, there is provided a short range communications network 32 for transmission ranges of 32 feet to over 300 feet and which generally use local access points including Bluetooth™, WLAN, UWB, WUSB, and other wireless communication network types that are generally known in the art. Additionally, there is provided a long range communication network 34 which employs land-based radio stations or satellites (both not shown) for transmission ranges in the miles including cellular networks and other data network types such as Data-Tac™. Such long and short range wireless communications may also be effectuated over different standards which are optimized for a given type of communication technology, such as Wi-Fi, EVDO, 3G-Long Term Evolution, 4G, LTE and other like communication protocols. Of note, the various wireless communications protocols also have varying degrees of security, such as encryption standards. For instance, the 802.11i protocol standard for WLAN communications utilizes the AES-CCP algorithm for data encryption whereas Wi-Fi protocol based networks may still employ the Wired Equivalent Privacy (WEP) security algorithm, a generally known insecure protocol. Additionally, the various communication networks 22 may be serviced by wireless communication service providers which bill for data exchanges over the networks 22 and at various rates. These characteristics will define the basis upon which a communication link over one or more select wireless communications networks 22 will be established by the multi-radio wireless modem 16, as will be further described herein below.

Still referring to FIG. 1, in addition to the wireless networks 22, communication channels established between the application server 28 and the mobile client application as in 12 are also linked via interposed communication systems (not shown), for example through a leased line on a Packet Switched Telecommunications Network (PSTN), async, bisync, or, more commonly, X.25 dedicated circuits. The multi-radio wireless modem 16 may illustratively connect to a data network such as the Internet, to which the application server 28 is connected, via a base station (not shown) maintained by an Internet Access Provider (IAP) or a wireless communication service provider.

Still referring to FIG. 1, data exchanged over communications channels set up and maintained between the mobile client application as in 12 and the application server 28 illustratively takes advantage of the TCP/IP suite of protocols. The multi-radio wireless modem 16, when connecting to an Internet Server Provider (ISP) or the like for connection to the application server 28, will be assigned a public Internet Protocol (IP) address. A Network Address Translator (NAT) may be provided as part of the multi-radio wireless modem 16 to convert between an assigned public IP address and an assigned private IP address of the mobile client application as in 12. Of note, other protocols such as those conforming to ISO 8073 or other proprietary protocols may be employed for managing the server-client exchange of data. Illustratively, the mobile client application as in 12 may be identified by the IP address that it is assigned by the multi-radio wireless modem 16 for such an exchange, as will be described herein below. Alternatively, the name of the mobile client application as in 12 or its Media Access Control (MAC) address may be used for its identification. In a similar manner, the application server 28 may be identified by its destination IP address and port as is generally known in the art.

As will be further described herein below, the multi-radio wireless modem 16 is utilized to provide bi-directional communication between the mobile client application as in 12 and the application server 28 via the plurality of wireless radio modems as in 24. To facilitate the transfer of data over selected wireless communication networks 22 via the plurality of wireless radio modems as in 24, a service access controller 30 interposed between the mobile client application as in 12 and the modems as in 24 is provided to selectively switch data packets between the mobile client application as in 12 and a particular wireless radio modem as in 24. Such selective switching by the service access controller 30, in accordance with an embodiment of the present invention, is adapted to support one or more Point-to-Point Protocol over Ethernet (PPPoE) sessions with a plurality of Access Concentrators (ACs) for discriminatory access control to specific wireless communication networks 22 and is also adapted to support Dynamic Host Configuration Protocol (DHCP) sessions with a DHCP server for providing non-discriminatory access to all or some of the wireless communication networks 22.

Figure 2:
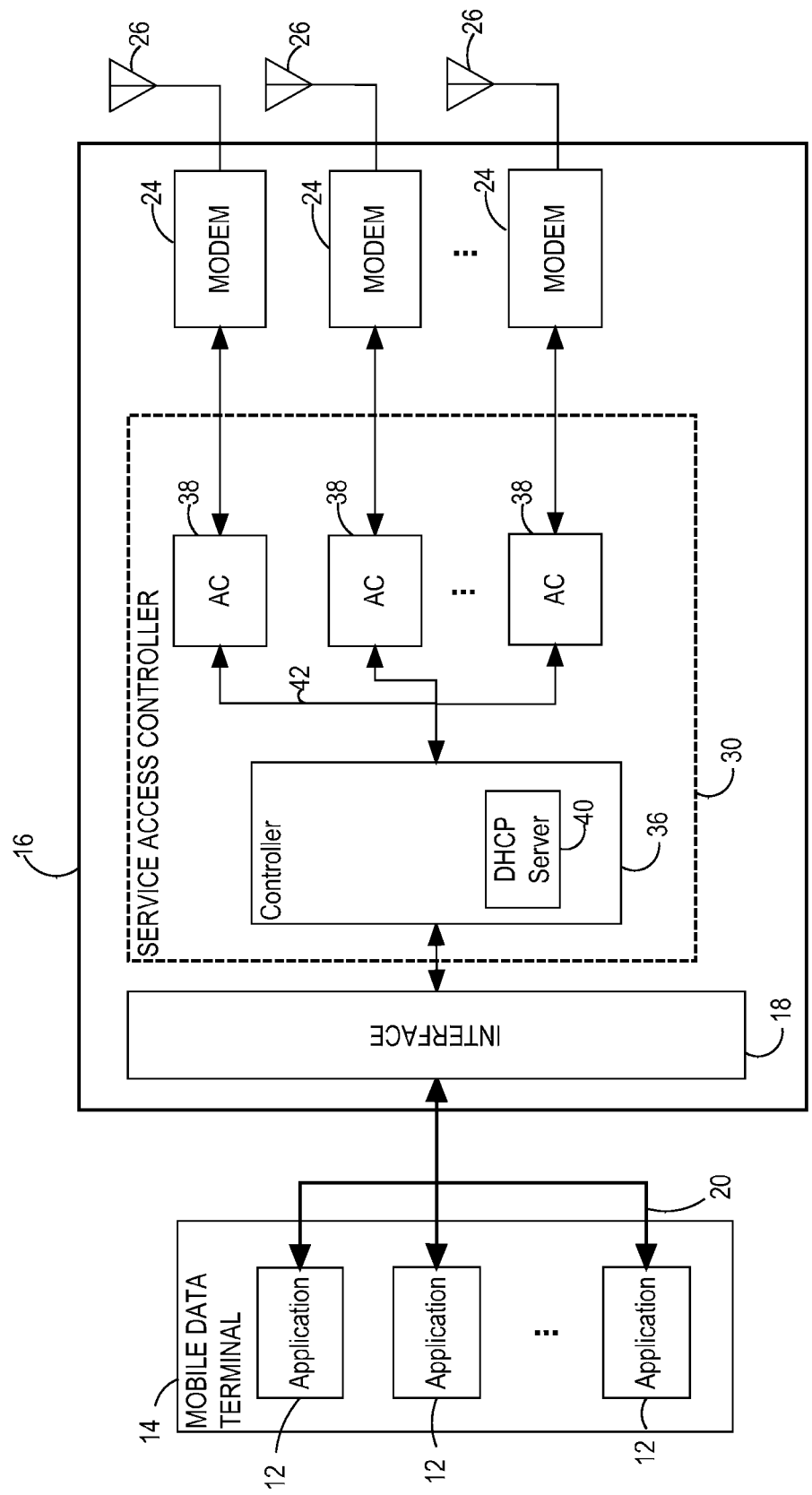
FIG. 2 is a schematic diagram of a multi-radio modem in accordance with an illustrative embodiment of the present invention.

Now referring to FIG. 2, the service access controller 30, in accordance with an illustrative embodiment of the present invention, comprises a controller 36, a plurality of Access Concentrators as in 38 each associated with a particular radio modem as in 24 and antenna as in 26, and a DHCP server 40. The controller 36 is tasked with policing data flow between the mobile client application as in 12, installed on the portable terminal as in 14, and particular Access Concentrators as in 38 over one or more selection lines as in 42. In particular, the controller 36 implements a line selection process which will switch Ethernet packets 46 (see FIG. 4) communicated over the Ethernet LAN 20 between the mobile client application as in 12 and the Access Concentrators as in 38 depending on a switching policy described herein below. In particular, the selection lines as in 42 are terminated by an Access Concentrator as in 38 which controls access to the services provided by a particular radio modem as in 24.

Now referring to FIG. 3A and FIG. 3B, in addition to FIG. 2, the communications between the mobile client application as in 12 and the application server 28 is illustratively implemented as part of a Transmission Control Protocol/Internet Protocol (TCP/IP) networking protocol stack. When connected to the Ethernet LAN 20, a TCP/IP stack on the portable terminal as in 14, for instance the TCP/IP stack that is built into the operating system managing the hardware and software of the portable terminal as in 14, for example Windows™, LINUX, or if the portable terminal as in 14 is a cellular mobile device connecting to the modem 16 over a wireless Ethernet LAN, then Android™ or iOS™, or the like, may be used to support IP traffic on the LAN 20. Additionally, to facilitate the establishment of PPPoE sessions with the multi-radio wireless modem 16, there is illustratively provided a mobile client application as in 12 that is a PPPoE enabled client for supporting PPPoE sessions with an Access Concentrator as in 38 over the LAN 20. To establish communications between the mobile client application as in 12 and the Access Concentrator as in 38 or between the mobile client application as in 12 and the DHCP server 40, the mobile client application as in 12 software (e.g., a DHCP or PPPoE enabled client) may illustratively run a client setup process. For example, the default client set-up process may be based on the DHCP protocol, which is illustratively embedded in the operating system of the portable terminal as in 14, or may be illustratively based on a client set-up process for a particular mobile client application as in 12 based on the PPPoE protocol. Generally, the DHCP and the PPPoE protocols will be employed by the multi-radio wireless modem 16 for use as address assignation protocols in a manner so as to control communication access to and from a particular radio modem as in 24.

Still referring to FIG. 2, FIGS. 3A and 3B, the PPPoE specification as is generally known by its codification pursuant to RFC 2516, is the predominant standard for utilizing the high bandwidth of Ethernet in conjunction with the security afforded by the Point-to-Point Protocol (PPP) as defined in the RFC 1548 in establishing direct Point-to-Point Protocol (PPP) connections between local networked devices over a local Ethernet based network. In this sense, an IP connection may be overlaid on a PPP connection such that PPP is used as a virtual dial up connection between points on a network. In a similar manner by which a network access server controls access to a network, the PPPoE Access Concentrator as in 38 controls access to the services of a radio modem as in 24. In particular, the Access Concentrator as in 38 in accordance with an illustrative embodiment of the present invention acts as a gateway to guard access to the radio modem as in 24 by verifying if the credentials of the mobile client application as in 12 are valid. To facilitate such access control, the present invention employs PPPoE for its standard methods of encryption, authentication, and compression as specified by PPP. The Challenge Handshake Authentication Protocol (CHAP) is an illustrative example of an authentication protocol used by the Access Concentrator as in 38 for access control.

Still referring to FIG. 2, FIGS. 3A and 3B, when the mobile client application as in 12 requires data transmission over a particular network 22 for reasons of security, cost, performance or the like, it can establish a connection with the Access Concentrator as in 38 controlling access to a particular radio modem as in 24. In accordance with an illustrative embodiment of the present invention, a PPPoE session is initiated by the mobile client application as in 12 residing on the client terminal as in 14 to connect to the particular Access Concentrator as in 38 for access to a radio modem 24 based on the required transmission characteristics provided by a wireless network as in 22 required by the mobile client application as in 12. In order for the PPPoE enabled mobile client application as in 12 to dial up an Access Concentrator as in 38 controlling access to a particular radio modem as in 24, a PPPoE session initiation is undertaken by the mobile client application as in 12 which involves a PPPoE discovery stage as is generally known in the art. During the PPPoE discovery stage, the PPPoE enabled mobile client application as in 12 will negotiate a PPPoE session with the Access Concentrator as in 38 prior to gaining access to the radio modem as in 24. Of note, only after a PPPoE session is established subsequent to the PPPoE discovery stage can data be transferred between the mobile client application as in 12 and the radio modem as in 24. Upon completion of a PPPoE discovery, an IP address is assigned to the dial-up adapter (not shown) forming part of the mobile client application as in 12 for use in such subsequent data exchanges as described herein below.

Still referring to FIG. 2 and FIG. 3B, when the mobile client application as in 12 does not require data transmission via a particular network 22, it will establish a connection with the DHCP server 40 for indiscriminate access to the one or more modems as in 24. To facilitate the establishment of DHCP sessions with the multi-radio wireless modem 16, there is illustratively provided a mobile client application as in 12 that is a DHCP enabled client for supporting DHCP sessions with the DHCP server as in 40, over a LAN, such as the Ethernet LAN 20. The DHCP specification, as is generally known by its codification pursuant to RFC 2131 specification, is an automatic configuration protocol for connecting the mobile client application as in 12 to the multi-radio wireless modem 16 when transmission of data over a particular communication network 22 is not required. The DHCP client, in this case the mobile client application as in 12, will negotiate a connection with the DHCP server as in 40 to acquire configure parameters prior to gaining access to the radio modems as in 24. As a result of this negotiation, the DHCP server 40 will assign an IP address to the mobile client application as in 12, for example to the dial-up adapter (not shown) forming part of the mobile client application as in 12 in a similar manner that IP addresses are assigned to computers connected to IP networks before they can communicate with other computers on a network. Generally, when the DHCP enabled mobile client application as in 12 connects to the Ethernet LAN 20, a query initiated by the mobile client application as in 12 as part of a DHCP discovery stage as is known in the art is typically immediately initiated and an IP assignation process is completed before the mobile client application as in 12 can exchange data with the multi-radio wireless modem 16.

Figure 4:
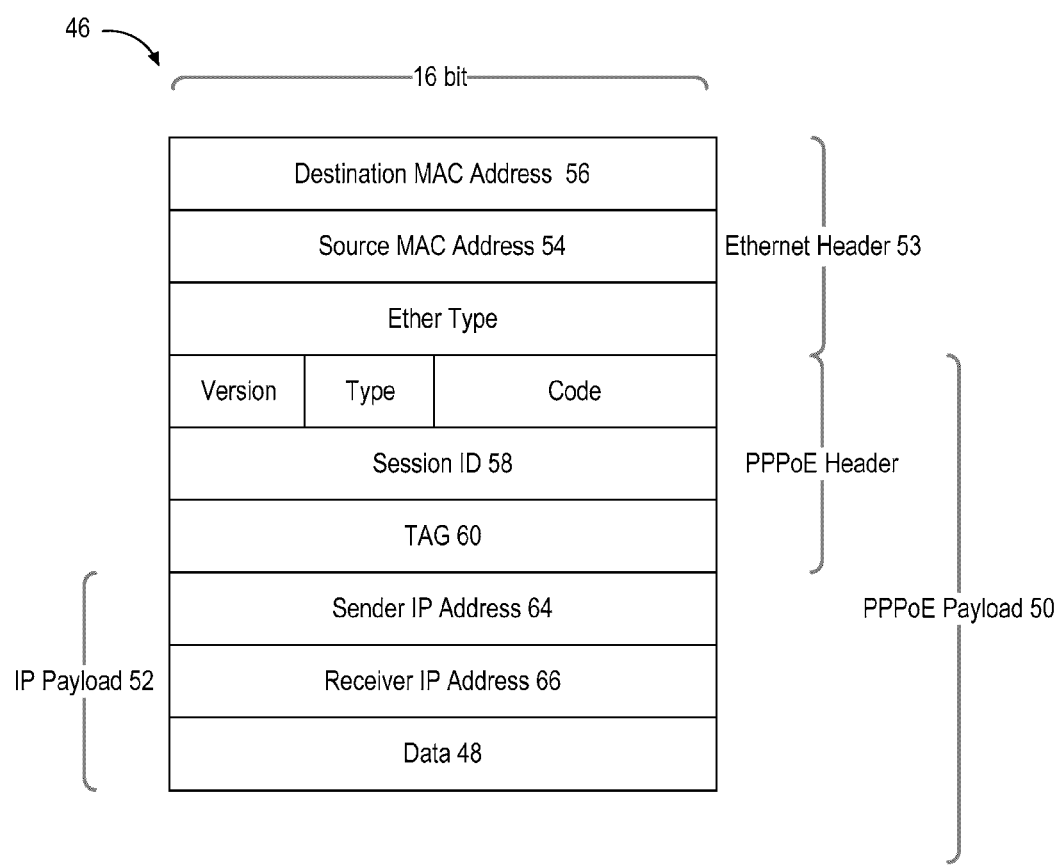
FIG. 4 is an exemplary Ethernet packet comprising a PPPoE payload encapsulating an IP payload.

Now referring to FIG. 4, in addition to FIGS. 3A and 3B, there is provided an illustrative example of an Ethernet frame 46 encapsulating data 48 in the form of a PPPoE payload 50 in addition to an IP payload 52 further encapsulated within the PPPoE payload 50. The Ethernet frame 46 further comprises various data fields such an Ethernet header 53 comprising a Source MAC address 54 string and a Destination MAC address 56 string, in addition to other data as is generally known in the art. The PPPoE frame payload 50 for PPPoE sessions comprises a SESSION ID 58 field in addition to a service-name TAG 60 field which may be used to uniquely identify a particular Access Concentrator as in 38. The TAG 60 field may illustratively comprise a combination of trademark, model, and serial ID information, or simply an UTF-8 rendition of the MAC address 62 (see FIG. 5) of the modem as in 24 used by the mobile client application as in 12 for requesting communication over a particular network 22. During a PPPoE session, the SESSION ID 58 value is fixed for a given PPP session and defines a PPP session along with the Ethernet Source MAC address 54 of the mobile client application as in 12 and the Destination MAC address 56. In accordance with an illustrative embodiment of the present invention, the service access controller 30 extracts these Ethernet packet fields to determine the source and destination for the purpose of routing the Ethernet frames 46 to the appropriate Access Concentrator as in 38 in a manner as will be described herein below. Additionally, or alternatively, the service access controller 30 may extract a Sender IP Address 64 or a Receiver IP address 66 from the IP payload 52 during a DHCP session also described herein below.

Now referring back to FIG. 2, the controller 36 facilitates the IP assignation and communication exchanges between the mobile client application as in 12 and either the Access Concentrator as in 38 or the DHCP server as in 40 in a manner that is now described. Illustratively, the multi-radio modem 16 will assign IP addresses to each mobile client application as in 12 connected to the radio modem 16 via the interface 18. For instance, IP allocation requests by the mobile client application as in 12 will be granted by either the DHCP server 40 or an Access Concentrator as in 38 depending on the type of network 22 the mobile client application as in 12 requires to communicate over. The assignation of an IP address by either the Access Concentrator as in 38 or the DHCP server 40 will be monitored by the controller 36 and communication session information, such as the Session ID 58 or Sender IP Address 64, is stored in a table for subsequent communications once an IP address has been assigned to a mobile application client as in 12. In particular, once the controller 36 has recorded the session established between the mobile client application as in 12 and the appropriate Access Concentrator as in 38, communications will be appropriately directed based on such communication session information.

Figure 5:
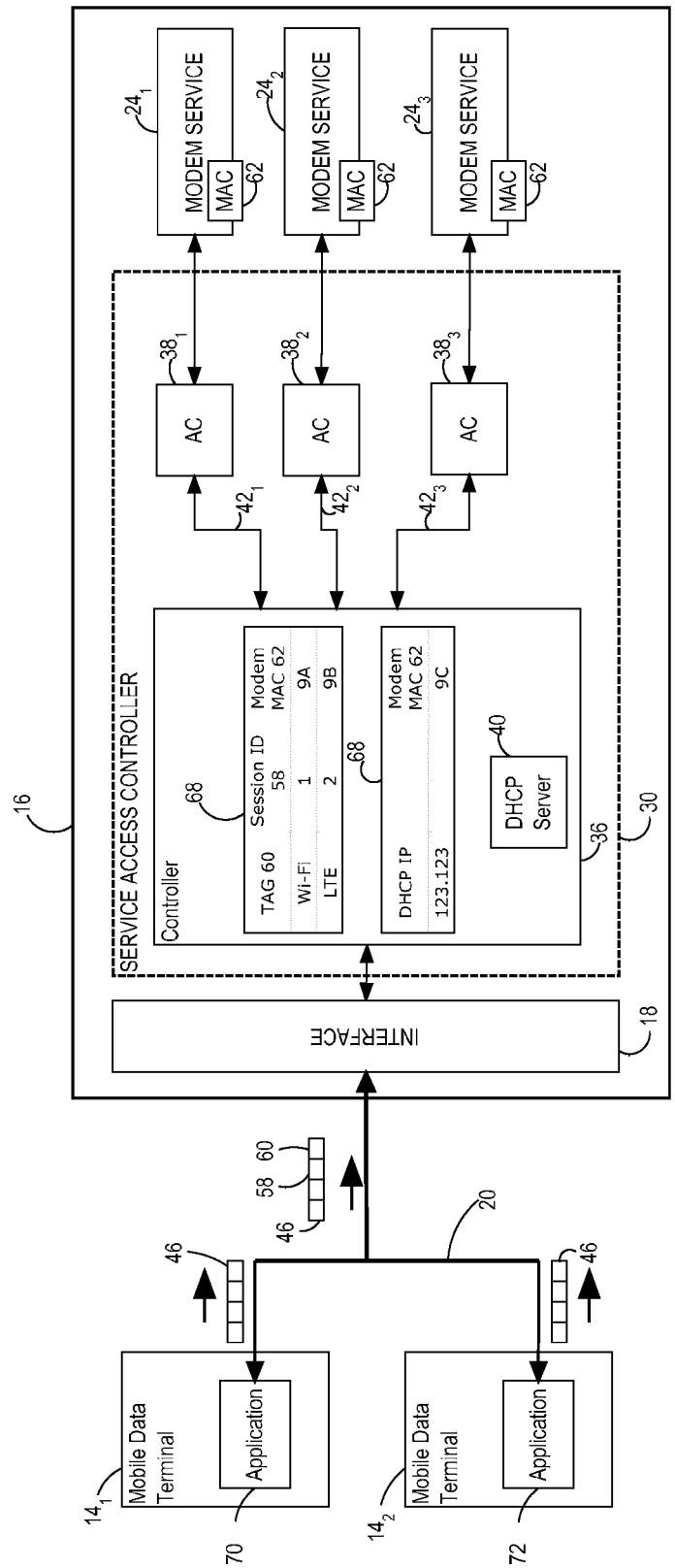
FIG. 5 is an illustrative example of wireless radio modem access control in accordance with an illustrative embodiment of the present invention.

Referring now to FIG. 5, in addition to FIG. 2, the assignation of an IP address by an Access Concentrator as in 38 or a DHCP Server 40 and subsequent packet routing between the mobile client application as in 12 and an appropriate radio modem as in 24 will now be described. In particular, during a PPPoE or a DHCP discovery stage, the controller 36 will broadcast the discovery packets received at the interface 18 to the Access Concentrator(s) as in 38 or DHCP server 40 so that the mobile client application as in 12 is able to discover the appropriate server. The controller 36 will thus forward the Ethernet Packets as in 46 containing the discovery packets over the lines as in 42. Illustratively, the mobile client application as in 12 requesting a PPPoE session with a specific Access Concentrator as in 38 will first perform a PPPoE Access Concentrator discovery as is generally known in the art in order to establish a PPPoE SESSION ID 58. By monitoring the interface 18, in particular by examining incoming Ethernet packets 46 and its various data fields for such discovery stage packets, such as a PADI packet, the controller 36 identifies which server the Ethernet packet 46 should be subsequently switched to over a selected line as in 42 during a PPPoE session. For example, the examined packet 46 may specify a service name in the TAG 60 field of a specific service offered by an Access Concentrator as in 38, for instance "Wi-Fi", "DataTac" or the like, which may describe the type of radio modem as in 24 the mobile client application as in 12 desires to use. The subsequent Discovery packets associated with the PPPoE discovery stages are monitored and forwarded in a similar manner to the appropriate Access Concentrator as in 38. Once the credentials of the mobile client application as in 12 are verified the IP address is assigned to the mobile client application as in 12.

Still referring to FIG. 2 and FIG. 5, should the access controller 36 monitor a DHCP request command contained within an Ethernet Packet 46 during an IP discovery stage made by the mobile client application as in 12, the access controller 36 switches the Ethernet Packet 46 to the DHCP server 40 for IP assignation in a similar manner as described herein above.

Still referring to FIG. 5, in addition to FIG. 4, once the discovery stage is successfully completed, the mobile client application as in 12 and the selected Access Concentrator as in 38 or the DHCP server 40 have the information they require to build a PPPoE session or a DHCP connectionless session. During the discovery stages, the access controller 36 illustratively stores the assigned IP information in a destination management table 68. Information stored within the destination management table 68 may include the DHCP assigned IP addresses, in particular the Sender IP address 64 or the Receiver IP address 66, and the PPPoE assigned IP addresses in addition to the MAC addresses 62 of the radio modem as in 24, the Session ID 58 or any other information that can identify the mobile client application as in 12. Based upon these values stored in the destination management table 68, communication exchanges between the mobile client application as in 12 may be directed to and from a particular radio modem as in 24 whose access has been previously granted by an Access Concentrator as in 38. Similarly, communication exchanges based on a DHCP IP assignation between a mobile client application as in 12 may be directed between any radio modem as in 24 and that DHCP enabled client application as in 12 depending on the routing policies of the access controller 36 described herein below.

Still referring to FIG. 5, as part of the packet routing function of the service access controller 30, the controller 36 implements a line selection process which switches the Ethernet packets 46 exchanged between the mobile client application as in 12 and the Access Concentrators as in 38 according to the previously assigned IP addresses of the mobile client application as in 12 by an Access Concentrator 38 or the DHCP server 40. Additionally, the controller 36 may illustratively switch the Ethernet packets 46 based on the Session ID 58 for a PPPoE session previously established between a mobile client application as in 12 and an Access Concentrator as in 38, or based on the Sender IP address 64 or the Receiver IP address 64. As part of this packet switching function, the TAG 60, the Session ID 58, and the sender IP address 64 may be used as a search key for searching within the destination management table 68 for the corresponding MAC address 62 of the modem as in 24 and the appropriate line as in 42 over which to switch the packet 46.

Still referring to FIG. 5, in addition to FIG. 1, there is provided an exemplary destination management table 68 for associating a radio modem as in 24 with a first mobile client application 70 requiring a secured communication link over a wireless network 22, such as the long range communication network 34 operating on the 802.11i protocol or the like and accessed via modems $24_1$ and $24_2$, for the exchange of sensitive mission critical data. There is also provided a second mobile client application 72 requiring a communication link over a short range communications network 32 operating on the Wi-Fi protocol and accessed via modem $24_3$, for illustratively and cost-effectively downloading Operating System updates or the like. Illustratively, the first mobile client application 70 is running on a first mobile device terminal $14_1$ and the second mobile client application 72 is running on a second mobile device terminal $14_2$. Based on the examination of intercepted Ethernet Packets 46 transmitted over the Ethernet LAN 20 by these terminals, the controller 36 is able to select the line 42 over which the Ethernet packets 46 will be directed based upon the lookup in the management table 68. The routing of an Ethernet packet 46 exchanged between the first mobile application 70 over lines $42_1$ and $42_2$ may be based on the Session ID 58 for a PPPoE session with a particular Access Concentrator as in $38_1$ or $38_2$, respectively, that had been previously established in a manner as described herein above, or may be based on an IP Sender address 64 for a DHCP session with the DHCP server 40. For instance, Ethernet Packets 46 exchanged between the first mobile application client 70 are routed over the line $42_1$ to radio modem $24_1$ for communication over the long range communication network 34. Additionally, Ethernet Packets 46 exchanged between the second mobile client application 72 are routed over the line $42_3$ to radio modem $24_3$ for communication over the short range communication network 32.

Still referring to FIG. 1 and FIG. 5, the access controller 36 may also implement other routing policies. For instance, the access controller 36 may provide for simultaneous routing of Ethernet packets 46 to radio modems $24_1$ and $24_2$ for modulation of data over two long range wireless communication networks 34 which both provide a secured wireless link for the first mobile application 70. Similarly, for a second mobile client application 72 which does not require a secured communication link or any particular communication requirements (i.e. no performance, security, or cost requirements) and has previously established a DHCP session, the controller 36 may opt by default to route data over all or a combination of wireless networks 22 by switching data to modems $24_1$, $24_2$, and $24_3$, or a combination thereof. In switching data to the modems in such a manner as illustrated, the Access Concentrators as in 38 act as a bridge between the controller 36 and the modems as in 24 for simply retransmitting data there between. Switching in such a manner may also be undertaken based upon the load or availability of the networks 22. Alternatively, switching may be undertaken based upon the network 22 that provides the lowest data usage costs, such as a Wi-Fi network or other quality of service (QoS) parameters such as latency and throughput. Of note, the system 10 may also illustratively provide for simultaneous communications over the networks 32, 34 and simultaneous tunneling for redundancy in a manner that is known in the art.

Figure 6:
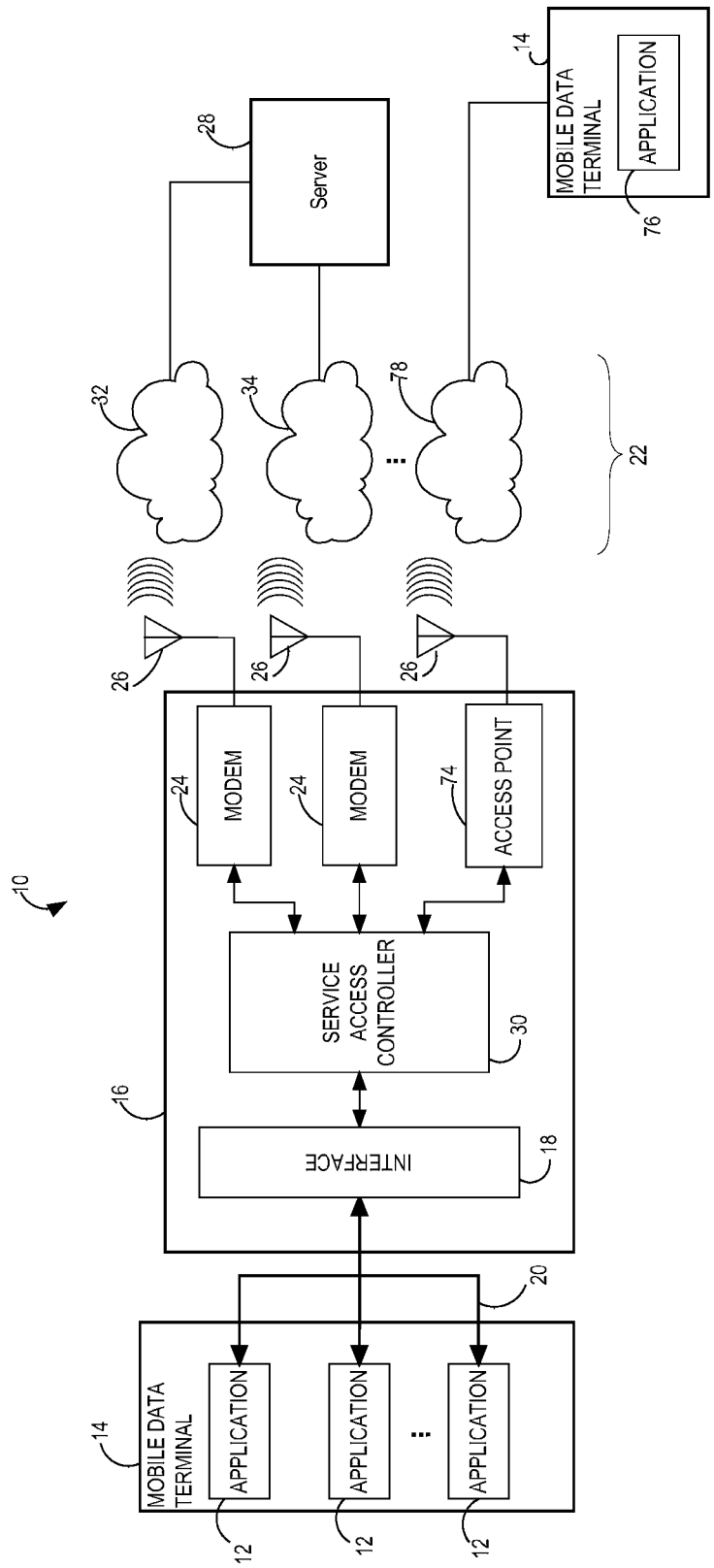
FIG. 6 is a schematic diagram of a mobile wireless communication system comprising a Wi-Fi access point in accordance with an illustrative embodiment of the present invention.

Now referring to FIG. 6, in addition to FIG. 1, in accordance with an alternative embodiment of the present invention, there is provided a Wi-Fi access point 74 for providing a Wi-Fi enabled mobile client application 76 to employ mobile wireless communication system for dialing up specific radio modems as in 24 for communication over select wireless networks 22. As part of this alternative embodiment, a Wi-Fi enable radio modem 74 is configured to act in a manner similar to the interface 18 by communicating via a Wi-Fi network 78. Accordingly, data packets received by the Wi-Fi access point 74 are examined by the service access controller 36 in a similar manner as described herein above for examining Ethernet frames 46, and are appropriately switched to an Access Concentrator as in 38 for access to a radio modem as in 24. If a default connection is requested, in that no specific use of a radio modem as in 24 is required by the Wi-Fi enabled mobile client application 76, data packets received by the Wi-Fi access point 74 are switched indiscriminately to the radio modems as in 24. Of note, other switching policies as described herein above may be implemented for simultaneous routing data from the Wi-Fi enabled mobile client application 76 over various communication networks 22.

Referring back to FIG. 1, in an alternative embodiment the modem 16 may comprise a dedicated PPPoE interface 80 for sending commands to the modem 16 or receiving information from the modem 16. This additional PPPoE interface 80 may be used, for example, to inquire about the status of the various networks 22 accessible via the modem 16, usage statistics and/or for allowing an external application to configure the modem 16 and the method(s) to be used when selecting which networks as in 22 to be used for a particular transmission.

Although the present invention has been described herein above by way of specific embodiments thereof, it can be modified without departing from the spirit and nature of the subject invention as defined in the appended claims.

I claim:

1. A method of transmitting data from a PPPoE enabled client to a remote server having a server address via a first of a plurality of different wireless networks and a second of the plurality of different wireless networks, the method comprising:
   connecting the PPPoE enabled client and an access concentrator to an Ethernet LAN, said access concentrator controlling access to a radio modem for communicating via the selected wireless network, wherein said access concentrator is one of a plurality of access concentrators each controlling access to a respective one of a plurality of radio modems, a first of said radio modems for communicating via the first of the plurality of different wireless networks and a second of said radio modems for communicating via the second of the plurality of different wireless networks;
   establishing a PPPoE session using the Ethernet LAN between the PPPoE enabled client and said access concentrator, said access concentrator assigning a client address to the PPPoE enabled client;
   opening a connection between the PPPoE enabled client and the remote server using the server address, said assigned client IP address and said PPPoE session over the first wireless network and the second wireless network; and
   transmitting data from the PPPoE enabled client to the remote server using said connection and at least one of the first wireless network and the second wireless network.

2. The method of claim 1, further comprising, prior to establishing said PPPoE session, the PPPoE enabled client discovering said access concentrator on said Ethernet LAN.

3. The method of claim 1, wherein the server address comprises a server IP address, wherein said client address comprises a client IP address and further wherein said opening a connection comprises opening a TCP/IP connection between the PPPoE enabled client and the remote server.

4. The method of claim 1, wherein the plurality of different wireless networks comprises a particular network type, wherein transmission of data between the PPPoE enabled client and the remote server is to be via the particular network type, the method further comprising, prior to said establishing, informing the PPPoE enabled client of at least one access concentrator controlling access to a radio modem for communicating via the particular wireless network type.

5. The method of claim 4, wherein the particular wireless network type comprises one of Datatac, Bluetooth, WLAN, UWB, WUSB, WiFi, EV-DO and 3G, 4G, and LTE.

6. The method of claim 1, further comprising:
   connecting a second PPPoE enabled client and a second access concentrator to the Ethernet LAN, said second access concentrator controlling access to a second radio modem for communicating via a second selected wireless network;
   establishing a second PPPoE session using the Ethernet LAN between the second PPPoE enabled client and said second access concentrator, said second access concentrator assigning a second client address to the second PPPoE enabled client;
   opening a second connection between the second PPPoE enabled client and the remote server using the server address, said second assigned client IP address and said second PPPoE session over the second selected wireless network; and
   transmitting data from the second PPPoE enabled client to the remote server using said second connection.

7. A multi-radio modem for interconnecting at least one PPPoE DHCP enabled client on an Ethernet LAN with a remote server via at least two of a plurality of different wireless networks, the multi-radio modem comprising:
   an interface configured for attachment to the Ethernet LAN;
   a plurality of radio modems, each of said radio modems for communicating via a respective one of the plurality of different wireless networks simultaneously;
   a plurality of access concentrators, one of said concentrators associated with each of said radio modems for assigning an address to a connected one of the at least one PPPoE enabled client;
   a controller for coordinating data flow between said at least one radio modem and each connected PPPoE enabled client based on said assigned address; and
   a DHCP server for assigning an IP address to a connected one of the at least one DHCP enabled client, wherein said controller coordinates data flow between the at least one DHCP enabled client and said at least one radio modems based on said assigned Internet Protocol address of the DHCP client.

8. The multi-radio modem of claim 7, wherein said assigned address is an IP address.

9. The multi-radio modem of claim 7, wherein each of said concentrators is associated with one of said radio modems and wherein each of said concentrators is for assigning an address to one of a plurality of PPPoE enabled clients.

10. A mobile wireless communication system comprising:
   a plurality of wireless networks
   an Ethernet LAN;
   a PPPoE enabled client connected to said Ethernet LAN; and
   a multi-radio modem connected to said Ethernet LAN and comprising a plurality of radio modems, wherein each of said radio modems provides simultaneous access to a different one of said plurality of wireless networks, and a plurality of access concentrators, one of said concentrators associated with each of said radio modems;
   a PPPoE session between said PPPoE enabled client and a connected one of said access concentrator, wherein said connected access concentrator provides a client address to said PPPoE enabled client;
   a remote server having a remote address;
   a data connection between said PPPoE enabled client and said remote server using said PPPoE session, said client address, said server address and over a respective wireless network of said connected access concentrator; and
   a DHCP enabled client, a DHCP server connected to said Ethernet LAN for controlling access to said one or more radio modems and for assigning an Internet Protocol address to said at least one DHCP enabled client, wherein said Ethernet LAN connects the at least one DHCP enabled client to said at least one multi-radio.

11. The system of claim 10, comprising a plurality of said PPPoE enabled clients connected to said Ethernet LAN, a PPPoE session between each of said PPPoE enabled clients and a respective one of said access concentrators, each of said access concentrators providing a client address to a connected one of said plurality PPPoE enabled clients.

12. The system of claim 11, further comprising a controller for coordinating data flow between said plurality of PPPoE enabled clients and said plurality of radio modems according to said assigned address.

13. The system of claim 10, further comprising:
a plurality of PPPoE enabled clients;
a PPPoE session between each of said PPPoE enabled clients and a respective connected one of said access concentrators, wherein said connected access concentrators provide a client address to said connected ones of said PPPoE enabled clients; and
a data connection between each PPPoE enabled client and said remote server using a respective one of said PPPoE sessions, said client address, said server address and over a respective wireless network of said connected access concentrator.

* * * * *